United States Patent [19]

Nott

[11] Patent Number: 4,690,739

[45] Date of Patent: Sep. 1, 1987

[54] ELECTROLYTIC PROCESS FOR PRODUCING EXTREMELY LOW CHLORIDE ANION EXCHANGE RESINS

[76] Inventor: Babu R. Nott, 4144 Powderhorn Crescent, Mississauga, Ontario, Canada, L5L 3B9

[21] Appl. No.: 924,160

[22] Filed: Oct. 27, 1986

Related U.S. Application Data

[63] Continuation of Ser. No. 776,784, Sep. 17, 1985, abandoned.

[51] Int. Cl.[4] .............................................. B01D 13/02
[52] U.S. Cl. .................................... 204/131; 204/128
[58] Field of Search ............... 204/98, 128, 130, 131, 204/132

[56] References Cited

U.S. PATENT DOCUMENTS

| | | | |
|---|---|---|---|
| 2,763,607 | 9/1956 | Staverman | 204/131 |
| 2,788,319 | 4/1957 | Pearson | 204/131 |
| 2,812,300 | 11/1957 | Pearson | 204/131 |
| 3,180,814 | 4/1965 | Kollsman | 204/131 |
| 3,180,815 | 4/1965 | Kollsman | 204/131 |
| 4,445,987 | 5/1984 | Benedetto | 204/128 |

FOREIGN PATENT DOCUMENTS

| | | | |
|---|---|---|---|
| 44-22310 | 9/1969 | Japan | 204/131 |
| 50-61387 | 5/1975 | Japan | 204/130 |
| 22311 | 2/1980 | Japan | 204/131 |
| 0162993 | 9/1984 | Japan | 204/131 |
| 546361 | 2/1977 | U.S.S.R. | 204/131 |

*Primary Examiner*—John F. Niebling
*Assistant Examiner*—Terryence Chapman
*Attorney, Agent, or Firm*—Ridout & Maybee

[57] ABSTRACT

A method for removing chloride ions from an anion exchange resin to provide extremely low residual chloride concentration and comprises placing the resin in a cathode cell of an electrolytic cell, the electrolytic cell having an anode and a cathode, and anode and cathode cells being separated by an anion selective permeable membrane. Catholyte is flowed through the resin containing cathode cell and anolyte is flowed through the anode cell while a direct current is applied across the anode and cathode. Chloride or chlorine gas derived from the resin is removed from the anode cell.

9 Claims, 4 Drawing Figures

ELECTROLYTIC PROCESS FOR PRODUCING EXTREMELY LOW CHLORIDE ANION EXCHANGE RESINS

This application is a continuation of application Ser. No. 776,784 filed Sept. 17, 1985, now abandoned.

This invention relates to an electrolytic process for production of anion exchange resins having extremely low chloride concentrations.

Hydroxide form strong base anion exchange resins having low chloride concentrations are used in many deionization purification systems in order to minimize chloride ingress into the systems. Often, an anion exchange resin is mixed with a hydrogen form cation exchange resin for use in such a system. For example, many nuclear reactor purification systems employ a mixture of hydroxide form strong base anion exchange resin and hydrogen form cation exchange resin for the purpose of trapping unwanted or deleterious ionic species usually present in low concentrations.

Chloride induced stress corrosion cracking of stainless steel is a serious problem to be avoided in such sensitive systems as nuclear reactors. It is therefore, desirable to use an anion exchange resin having the lowest initial chloride ion concentration possible since the amount of residual chloride on the anion resin determines the extent of the leakage of chloride into the system being purified, and hence, often determines the useful service life of the ion exchange resins in such systems. Previously, hydroxide form anion exchange resins have been commercially prepared by subjecting them to solutions containing a large excess of high purity sodium hydroxide. The level of chloride concentration in the sodium hydroxide used to prepare an anion exchange resin using this process determines the minimum possible residual chloride concentration of the resin due to the establishment of an equilibrium distribution of chloride between the resin and the solution. By using the process of the present invention, an equilibrium is not established, and consequently, the chloride concentration associated with the anion exchange resin subjected to the process may be reduced to extremely low levels.

Ion exchange resins possess good electrical conductance. The concept of electrolytic regeneration of ion exchange resins has been known for sometime. For example, U.S. Pat. No. 2,812,300 to R. G. Pearson discloses an ion exchange apparatus in which a cation exchange resin bed is separated from an anion exchange resin bed by two diaphragms forming a channel between them. A direct current is passed between an anode placed in contact with the cation resin bed and a cathode placed in contact with the anion resin bed while a conducting solution is present in the resin beds and in the channel between the diaphragms. Hydrogen ions produced at the anode replace other cations on the cation resin and hydroxyl ions produced at the cathode replace other anions on the anion resin. This patent is not concerned with the problem addressed by the present process, and therefore, there is no teaching or suggestion in Pearson of a process for the production of an anion exchange resin having a low chloride concentration.

U.S. Pat. No. 3,645,884 to E. R. Gilliland, discloses a five compartment cell consisting of an anode compartment containing an anolyte, a cation resin compartment, a flushing compartment, an anion resin compartment, and a cathode compartment containing a catholyte. The anion resin compartment is separated from the cathode compartment and the flushing compartment by an anion selective permeable membrane. The cation resin compartment is separated from the anode compartment and the flushing compartment by a cation selective permeable membrane. The solution to be demineralized is first passed through the cation resin compartment and the effluent from the cation resin compartment is then passed through the anion resin compartment. Regeneration of the resins involved application of direct current between the electrodes. During the regeneration, hydrogen ions are produced at the anode and migrate across the cation selective membrane into the cation resin compartment where they replace the other cations on the cation resin. In a similar manner, hydroxyl ions are produced at the cathode and migrate through the anion selective membrane into the anion resin compartment where they replace the other anions on the anion resin. The cation and anion resins are thus regenerated. Once again, the problem of reducing the chloride concentration in the anion exchange resin below equilibrium levels is not addressed. Therefore, this patent contains no teaching or suggestion of the features of the process of the present invention.

The present process utilizes electric current for the removal of chloride ions from anion exchange resins. However, the process of the invention involves the removal of chloride from the solution contacting the resin, thereby causing the chloride distribution equilibrium between the anion resin and the surrounding solution to be broken. This nonequilibrium system is provided by causing liberated chloride ions to migrate into an anolyte solution where the ions are removed as chlorine gas formed at the anode or by bleeding anolyte solution from the system.

Accordingly, the present invention provides a method for removing chloride ions from an anion exchange resin, comprising placing the resin in a cathode cell of an electrolytic cell having an anode and a cathode, and anode and cathode cells being separated by an anion selective permeable membrane. Flowing catholyte through the cathode cell and flowing anolyte through the anode cell while applying a direct current across the cathode and anode thereby causing migration of chloride ions from the resin through the anion membrane and into the anode cell; and removing chloride or chlorine gas from the anode cell. The method is continued for a sufficient time to reduce the chloride concentration of the resin to a desired level below that of an equilibrium distribution between the resin and an equivalent amount of catholyte under non-electrolytic conditions.

BRIEF DESCRIPTION OF THE DRAWINGS

A preferred embodiment of the invention is described below with reference being made to the drawings in which:

Referring to FIG. 1, a cell 5 for carrying out the process of the invention comprises a spacer 10 having flat front and rear surfaces. At least one large aperture is provided through the spacer 10 from front to rear defining a cathode cell 11. The cathode cell 11 is further defined by a cathode 12 and an anion selective permeable membrane 13.

As shown in FIG. 2, the spacer 10 may have more than one large aperture therethrough, thereby defining two or more cathode cells 11 in a parallel array.

Adjacent the cathode cell 11 is an anode cell 14 defined by a spacer 15. Two basic types of spacers 15 are commercially available, namely tortuous path or sheet flow spacers. The tortuous path type electromembrane spacer is preferred in the present invention.

Figure 4:
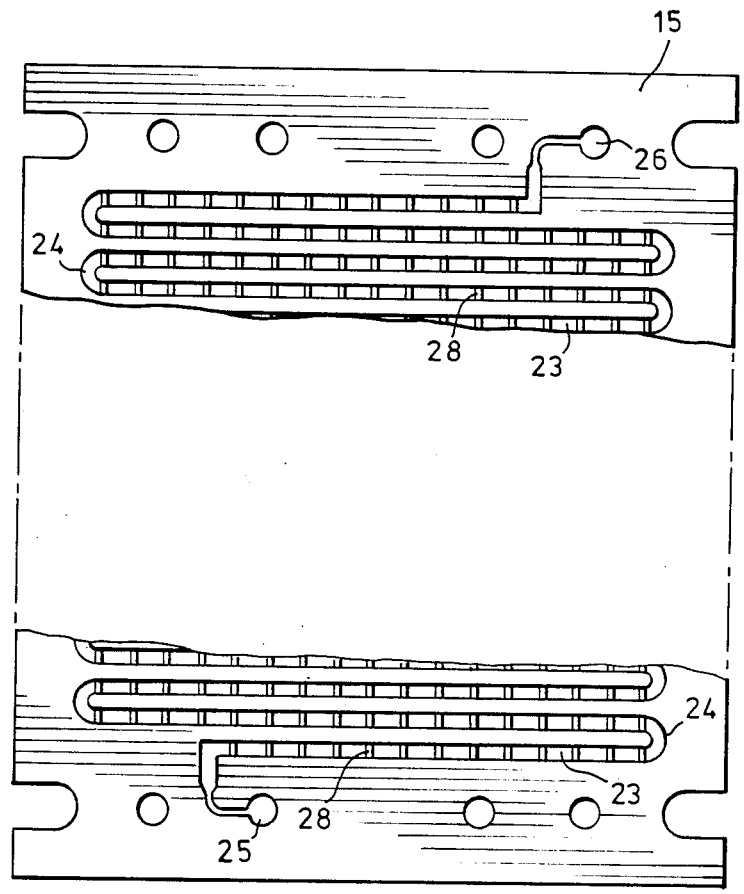
FIG. 4 is a plan view of a tortuous path spacer for the anode cell.

In the tortuous path type of spacer 15 (see FIG. 4) a long narrow path 23 is provided for the solution flow. This path 23 has a plurality of hairpin bends 24 so that the solution zigzags back and forth across the width of the cell 14 in traveling from an inlet 25 to an outlet 26 therefor. Usually, the solution pathway in the spacer 15 is provided with cross straps 28 to promote turbulence. Generally, the ratio of channel length to width in a tortuous path spacer is greater than 100:1 and the solution velocity is generally on the order of 30–50 cm/sec.

In contrast a sheet flow electromembrane spacer provides a flow of solution through the cell as a sheet of liquid. Generally, the channel length to width ratio in this type of spacer is on the order of 1:2 and the solution velocity is in the range of 5–15 cm/sec.

The anode cell 14 is further defined by the membrane 13 and an anode 16. The anode cell 14 is thin in comparison to the cathode cell 11 which may be up to about 15 mm thick, with about 10 mm being preferred. The thickness of the cathode cell 11 is limited by the quality of the current flow therethrough. Too great a thickness for the cell 11 results in an uneven current flow, and thus, in an uneven removal of chloride from the resin.

The cathode cell 11 contains an anion exchange resin 18 to be treated in accordance to the process of the invention and the cell 11 contains a catholyte solution 20, which in the process flows therethrough. The anode cell 14 contains an anolyte solution 22 which flows through it during the process of the invention.

The cathode and anode cells 11 and 14 are made of materials which are compatible with the resin and solutions contained in them. For the purpose of removing chloride from an hydroxide form anion exchange resin, a catholyte solution 20 for use in the cathode cell 11 comprises aqueous hydroxide, and an anolyte solution 22 for use in the anode cell 14 may comprise a dilute aqueous solution of a strong mineral acid. Under these circumstances, the cells 11 and 14 are suitably made of a polyethylene or polypropylene plastic having a high electrical resistance. Likewise, the cathode 12 and the anode 16 are made of materials which are compatible with the particular system design. In the system aforementioned, suitable materials for the cathode 12 comprise platinum, platinized columbium, or stainless steel and the anode 16 may suitably be platinum or platinized columbium. As will be apparent to the person skilled in this art, the choice of a material for the cathode 12 or the anode 16 depends to a large extent on the nature of the solution contacting it and may be any of a wide variety of materials.

The anion selective permeable membrane 13 separating the cells 11 and 14 may be any of a number of commercially available membranes having the property under electrolytic conditions of allowing the flow of anions through it to the substantial exclusion of cations. Examples of anion selective permeable membranes are disclosed in U.S. Pat. Nos. 2,730,768; 2,800,445; 2,860,096; and 2,860,097.

Figure 1:
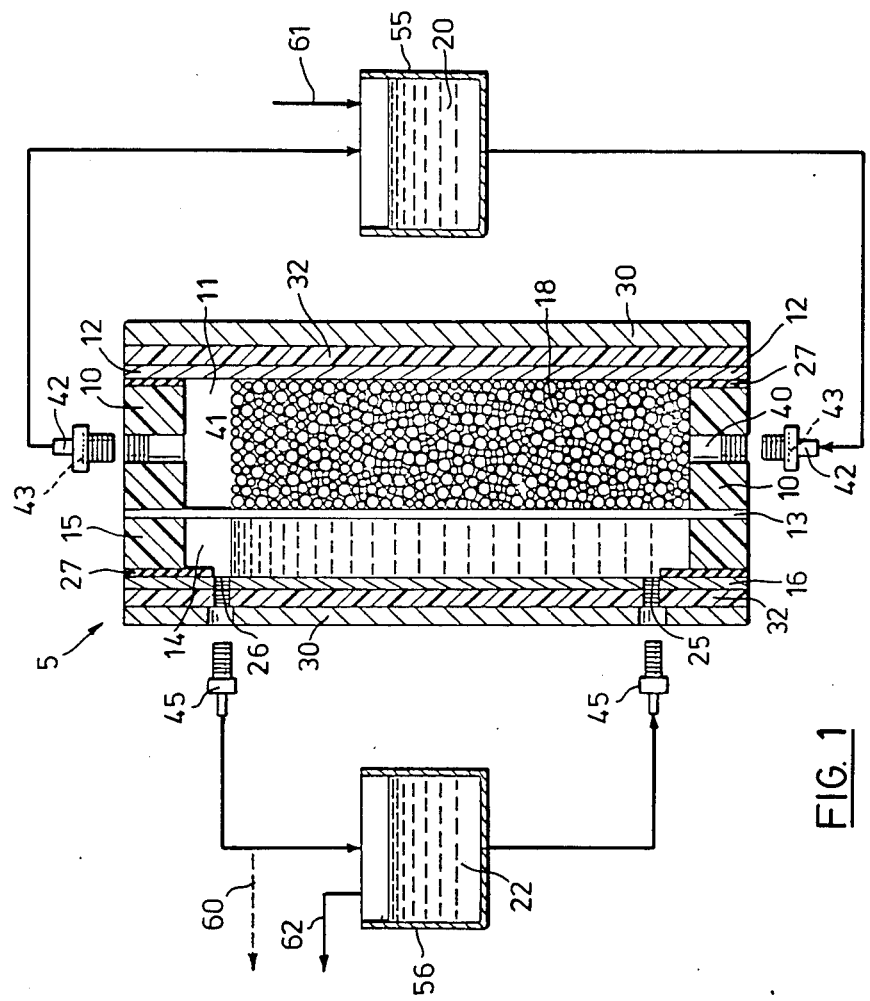
FIG. 1 is a cross-sectional view of an electrolytic cell suitable for carrying out the present invention.

Rubber gaskets 27 are provided between the anode 16 and the spacer 15 and between the cathode 12 and the spacer 10. The entire assembly is clamped together to effect a pressure tight seal about the perimeters of the cathode and anode cells 11 and 14. This pressure seal may be effected as shown in FIG. 1 by means of steel end plates 30 and tie rods (not shown). Insulation blocks 32 of plastic or other suitable material are interposed between the steel end plates 30 and the cathode 12 and anode 16.

The cathode cell 11 is provided with an inlet 40 and an outlet 41 each equipped with a threaded fitting 42 provided with a screen 43 for preventing escape of resin particles. Because the spacer 10 which comprises the cathode cell 11 is of sufficient thickness, the inlet 40 and outlet 41 can be provided through either end thereof. The flow of solution through the cell 11 is from bottom to top.

Likewise, the anode spacer 15 has an upward flow of solution therethrough, but because of the thinness of the spacer 15, the inlet 25 and outlet 26 for the anode cell 14 must be made through the side of the anode 16, insulation block 32 and end plate 30. The anode cell inlet 25 and outlet 26 are also provided with threaded fittings 45.

While the foregoing provides a basic description of the structure of the cell 5 used for carrying out the process of the invention, a number of variations in this basic design will be apparent to the person skilled in this art. Thus, as mentioned above, it can be seen from reference to FIG. 2 that the spacer 10 for the cathode cell 11 may comprise more than one large aperture therethrough. In the case of the spacer 10 shown in FIG. 2, two side by side apertures are provided to define adjacent cells 11.

Figure 2:
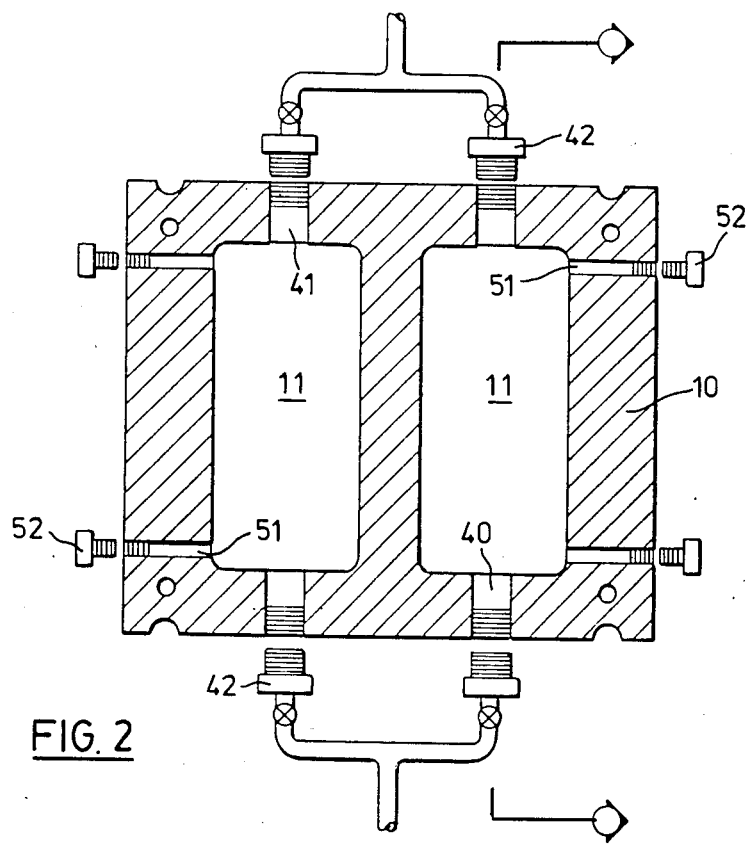
FIG. 2 is a sectional view of the cathode cell spacer.

For the purpose of monitoring the progress of the chloride removal process, sample taps 51 having threaded plugs 52 may be provided through the side wall of the block 10. Also, the inlets 40 and outlets 41 of the cells 11 are connected in parallel (FIG. 2).

Figure 3:
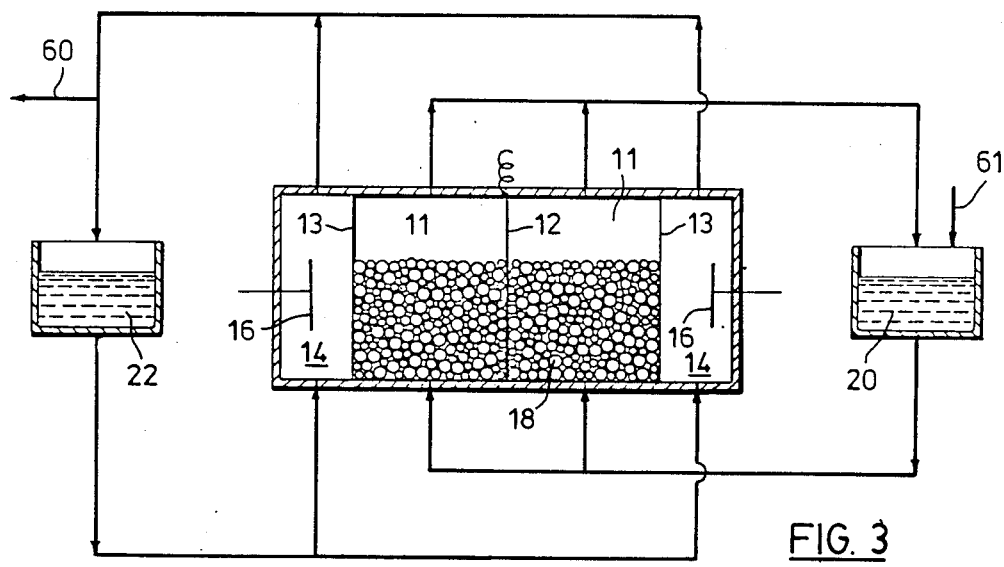
FIG. 3 is a schematic view of an alternative construction for a cell suitable for carrying out the invention.

As shown schematically in FIG. 3, the cell 5 of FIG. 1 may be doubled in a back to back fashion. Thus, cathode cells 11 are provided on either side of a cathode plate 12, and anode cells 14 are defined between membranes 13 and anodes 16.

As mentioned, the process of the invention is intended primarily for reducing the chloride ion concentration of a strong base anion exchange resin 18. Examples of such resins are presently sold under the trade marks Amberlite IRA-400, Amberlite IRA-410, Amberlite IRN-78, Dowex SBR, Dowex SBR-P and many others. The resin 18 to be treated is introduced into the cathode cells 11 as a slurry in deionized water through the outlets 41. The fittings 42 are then secured in the outlets 41.

Catholyte 20 from a tank 55 and anolyte 22 from a tank 56 are pumped upwardly through the cathode cell 11 and anode cell 14 respectively while a direct current is applied across the cell 5. The upward flow of catholyte 20 through the resin filled cell 11 ensures efficient removal of any gas from the resin bed 18 and facilitates venting of the gas in the catholyte tank 55. Similarly, the upward flow of anolyte 22 through the cell 14 facilitates flushing and venting of gases generated in the anode cell 14. To maintain constant liquid levels, provision is made to bleed anolyte 22 from the system (arrow 60) and to add make-up catholyte 20 to the system (arrow 61). This liquid maintenance may be conveniently carried out at the tanks 55 and 56.

In operation, the anolyte 22 and catholyte 20 may be heated to increase the current density in the cell 5. However, heating is not essential and if used, care should be taken to ensure that the resin 18 and the membrane 13 are not damaged by the heat employed. The catholyte 20, comprising aqueous hydroxide, provides a continuous supply of hydroxide ions to the resin 18. The current applied across the cell 5 causes the migration of chloride and hydroxide anions from sites on the resin 18, through the membrane 13 and to the anode 16. The vacant sites on the resin 18 are filled by the hydroxide ions supplied from the catholyte 20. The skilled person will understand that the foregoing represents a simplistic explanation of the dynamics of the process which is actually an electrochemically assisted breaking of the chloride/hydroxide equilibrium between the catholyte 20 and resin 18.

When an acidic anolyte 22 is used, the chloride ions migrating across the membrane 13 are combined and liberated as chlorine gas at the anode 16. If the anolyte 22 is an alkaline solution, the chloride is maintained in solution and is removed from the system by bleeding the anolyte 22 (arrow 62). Anolyte bleeding 60 is needed in any case due to the migration of a small amount of catholyte 20 across the membrane 13 due to electro-osmotic transport. This effect also requires periodic catholyte 20 make-up 61 at the tank 55.

Without limiting the scope of the present invention, the process may be more fully appreciated by reference to the following examples.

EXAMPLE 1

A two-compartment electrolytic cell was constructed using a polypropylene spacer 10, as shown in FIG. 2, for the cathode cell 11 and a commercially available tortuous path type polypropylene spacer 15, manufactured by Ionics, Inc., Cambridge, Mass., U.S.A. for the anolyte cell 14. A commercially available anion selective membrane 13, MA-3475R, manufactured by Ionac Chemical Co., Birmingham, N.J., U.S.A., was used to separate the two cells 11 and 14. Platinized columbium plates were used for the anode 16 and the cathode 12. Fluid inlet and outlet connections were provided in the spacer 10, as shown in FIG. 2, and in the insulation and end blocks 32 and 30 for the anolyte cell 14, as shown in FIG. 1. Rubber gaskets 27 were used between the polypropylene spacers and the electrodes to minimize leakage. The whole cell assembly was clamped between two steel end plates 30 by tie rods to effect a pressure tight seal. The cell dimensions were 22.5 cm × 25.0 cm; the effective cell area was about 220 cm$^2$.

The anion selective membrane was pre-treated, by soaking in 1 N sodium hydroxide and rinsing in deionized water. Two liter polypropylene bottles were used for the catholyte and anolyte recirculating tanks 55 and 56.

A commercially available, low chloride, type I strong base anion resin in hydroxide form, known as Amberlite, IRN-78, L/C, manufactured by Rohm and Haas Co., was used. A portion of the resin was soaked in deionized water for a few hours. Water was then drained from the resin by placing it in a separatory funnel and drawing vacuum over it according to the procedure described in ASTM D-2187. Five samples, approximately 1g each, of the drained resin were then subjected to neutron activation analysis to determine their chloride contents. The average chloride content was determined to be about 60 μg chloride/g resin.

Approximately 400 mL of the swollen resin was transferred, as a slurry in deionized water, into the cathode cell 11. Each subcompartment of the cell 11 contained about 200 mL of resin (see FIG. 2). The catholyte circulation tank 55 was charged with 2 L of 0.05 N sodium hydroxide solution and the anolyte circulation tank 56 was charged with 2 L of 0.04 N sulphuric acid solution. The solutions were at room temperature (about 23° C).

The catholyte 20 was circulated through the cathode cell 11 and the anolyte 22 was circulated through the anode cell 14. The electrodes were then connected to a dc power supply and a dc current was passed through the cell at 6.5 volts with an average current of 5.5 amp. for about 100 hours. During the run a small amount of the anolyte stream was bled, intermittently, from the system to maintain a constant level in the anolyte tank 56; make-up catholyte 20 (0.05 N sodium hydroxide) was added to the catholyte tank 55 to keep its liquid level approximately constant. At the end of the run, electric power to the cell 5 was disconnected and the resin 18 was removed from the cell 11. Five samples, 1 g each, of the resin 18 were drained, as described earlier, and their chloride content was determined by neutron activation analysis. The average chloride content of the anion resin, after electrolytic treatment in the cell, was determined to be about 30 μg chloride/g resin. Consumption of 0.05 N sodium hydroxide during the experiment was about 61 L. Assuming the total anion exchange capacity of the resin to be about 1.2 eq/L, the sodium hydroxide consumption, in the electrolytic process, was about 3.05 eq or about 6 times the stoichiometric amount.

In a separate test, 5 mL samples of Amberlite, IRN-78 L/C, resin from the same production lot, as was used in the above electrolytic run, were directly regenerated, with varying quantities of 1 N sodium hydroxide solution, prepared from the same grade sodium hydroxide pellets as was used in the electrolytic run. Chloride content of each of the directly regenerated resins was determined by neutron activation analysis. The objective was to compare the effectiveness of the electrolytic chloride removal process with the direct, conventional, regeneration. The results were as follows:

| | Average Chloride Content (μg chloride/g resin) | |
|---|---|---|
| Amount of NaOH Used | Before Regeneration | After Direct Regeneration |
| 10 × stoichiometric amount | 60 | 55 |
| 20 × stoichiometric amount | 60 | 48 |
| 30 × stoichiometric amount | 60 | 42 |
| 40 × stoichiometric amount | 60 | 39 |
| 50 × stoichiometric amount | 60 | 42 |

It is apparent that an equilibrium chloride content of about 40 μg chloride/g resin was reached when 30 times the stoichiometric requirement of sodium hydroxide was used and that larger amounts of sodium hydroxide did not reduce the chloride content to lower levels.

From the above experimental results, it is apparent that the chloride concentration of type I strong base, low chloride, anion exchange resins can be effectively reduced by the electrolytic process of the invention to levels lower than those achievable by direct regeneration with sodium hydroxide solutions. It is also apparent that considerably larger amounts of sodium hydroxide are required for direct regeneration as compared with the electrolytic process to achieve a given chloride level in the treated resin.

EXAMPLE 2

A type II strong base anion exchange resin, known as Amberlite IRA-410 (manufactured by Rohm and Haas Co.), was used in a two-compartment electrolytic cell as in Example 1. The resin was supplied in chloride form. About 50 mL of the resin were soaked in deionized water and drained as described in Example 1. Five samples of the resin, approximately 1 g each, were subjected to neutron activation analysis; the average chloride content of the resin was determined to be about 65,800 μg chloride/g resin.

A 400 mL batch of the resin was pre-treated in a 2″ diameter ion exchange column, using 13 bed volumes of 1 N sodium hydroxide at 35° C. at a flow rate of 16 bed volumes per hour. Assuming a total anion exchange capacity of 1.3 eq/L for the resin, this amounted to treatment with 10 times the stoichiometric amount of sodium hydroxide. The average chloride content of the pre-treated resin was determined, by neutron activation analysis, to be about 4240 μg chloride/g resin.

The pre-treated resin was then transferred, after rinsing in deionized water, to the cathode cell 11 of the electrolytic cell 5. A 0.05 N sodium hydroxide solution was used as the catholyte and 0.04 N sulphuric acid solution was used as the anolyte. The solutions were at room temperature (approx. 23° C.). The electrolytic run was carried out at a dc voltage of 8 volts, with an average current of 2.4 amp. for a duration of 20 days. At different times during the run small samples of resin—approximately 2 mL each—were withdrawn from each resin sub-compartment through the sampling ports 51 shown in FIG. 2. The samples were drained and analyzed for chloride content by neutron activation analysis. During the electrolytic run, a small portion of the anolyte was bled, intermittently, from the system to maintain a constant liquid level in the anolyte tank and make-up catholyte (0.05 N sodium hydroxide) was added to maintain a constant level in the catholyte circulation tank. The results were as follows:

| Run Time (days) | Average Chloride Content of Resin (μg chloride/ g resin) | Sodium Hydroxide Used During Electrolytic Run | Total Sodium Hydroxide Used (Including Pre-treatment) |
| --- | --- | --- | --- |
| 0 | 4,240 | 0 × stoich. amt. | 10 × stoich. amt. |
| 6 | 830 | 3.7 × stoich. amt. | 13.7 × stoich. amt. |
| 13 | 230 | 10.7 × stoich. amt. | 20.7 × stoich. amt. |
| 20 | 130 | 15.4 × stoich. amt. | 25.4 × stoich. amt. |

To compare the above results with those of direct treatment with sodium hydroxide, samples of the resin, from the same production batch as was used in the electrolytic run, were treated with varying amounts of 1 N sodium hydroxide at a flow rate of 2 bed volumes per hour. Chloride concentrations of the directly treated resins (as determined by neutron activation analysis) were as follows:

| Sodium Hydroxide Used for Direct Treatment | Average Chloride Content (μg chloride/g resin) | |
| --- | --- | --- |
| | Before Treatment | After Direct Treatment |
| 20 × stoich. amt. | 65,800 | 550 |
| 30 × stoich. amt. | 65,800 | 210 |
| 50 × stoich. amt. | 65,800 | 230 |

From the above results, it is apparent that the chloride content of type II strong base anion exchange resins can be reduced more effectively and to lower levels by the electrolytic process than by direct treatment with sodium hydroxide alone.

EXAMPLE 3

A type I strong base anion exchange resin, in hydroxide form, manufactured by Dow Chemical Co., known as Dowex SBR, was used in this experiment in which a four-compartment electrolytic cell of the type illustrated in FIG. 3 was used. A 0.05 N sodium hydroxide solution was used as the catholyte as well as the anolyte but in separate circuits.

A one-liter batch of the anion resin, in hydroxide form was soaked in deionized water. Samples of the fully swollen resin were drained following the procedure described in earlier examples, and subjected to neutron activation analysis to determine the chloride content. The average chloride content of the resin was determined to be about 240 μg chloride/g resin.

A total of 800 mL of the anion resin was transferred into the two resin compartments (i.e. approximately 200 mL resin in each sub-compartment). The catholyte and anolyte recirculating tanks were each charged with 0.05 N sodium hydroxide solution. The solution in the catholyte tank was kept warm at 50° C. The higher temperature was used to increase the current density in the cell and decrease electrolytic treatment time. The catholyte was circulated through the resin compartments of the cathode cell 11 and the anolyte was circulated through the anolyte cell compartments 14, each in a separate circuit. The electrolytic run was carried out at a dc voltage of 7 volts, with an average cell current of about 13 amp. for a duration of 94 hours. During the run, a portion of the anolyte was bled from the system and makeup catholyte was added to the catholyte tank. The average rate of make-up catholyte addition was approximately 0.5 L per hour. Samples of resin were withdrawn from each sub compartment, through the resin sampling ports 51 shown in FIG. 2, at different times during the run. Results of the electrolytic run were as follows:

| Run Time (hours) | Average Chloride Content of Resin (μg chloride/g resin) | Sodium Hydroxide Used |
| --- | --- | --- |
| 0 | 240 | 0 × stoich. amt. |
| 26 | 135 | 0.8 × stoich. amt. |
| 45 | 117 | 1.5 × stoich. amt. |
| 71 | 62 | 2.2 × stoich. amt. |
| 94 | 58 | 3.0 × stoich. amt. |

In a separate test, samples of the anion resin, from the same batch, as was used in the electrolytic run, were directly treated with varying amounts of 1N sodium hydroxide solution (of the same grade of purity as was used in the electrolytic run). The total anion exchange capacity of Dowex SBR resin was 1.2 eq/L in hydroxide form. Results of the direct treatment with sodium hydroxide were as follows:

| Amount of Sodium Hydroxide Used for Direct Treatment | Average Chloride Content of Resin ($\mu$g chloride/g resin) | |
| --- | --- | --- |
| | Before Treatment | After Treatment |
| 5 × stoich. amt. | 240 | 206 |
| 10 × stoich. amt. | 240 | 160 |
| 40 × stoich. amt. | 240 | 87 |
| 50 × stoich. amt. | 240 | 65 |

It is apparent, from a comparison of the results of the electrolytic run with those of direct sodium hydroxide treatment, that chloride content of type I strong base anion resin in hydroxide form, can be effectively reduced by the electrolytic process (using sodium hydroxide solution as the catholyte as well as the anolyte) to levels lower than those achievable by direct treatment with sodium hydroxide and using considerably smaller amounts of the alkali.

I claim:

1. An electrolytic method for producing a strong base anion. exchange resin having an extremely low chloride concentration, comprising:
    placing a resin having an undesirably high chloride concentration in a cathode cell of an electrolytic cell having an anode and a cathode, and having anode and cathode cells which are separated by an anion selective permeable membrane;
    flowing an aqueous hydroxide catholyte through the resin containing cathode cell and flowing an anolyte through the anode cell while applying a direct current across the cathode and anode thereby causing xigration of chloride ions from the resin through the xembrane and into the anode cell; and
    removing chloride or chlorine gas from the anode cell thereby reducing the concentration of chloride bound to the resin, and continuing the method for a sufficient time to reduce the chloride concentration of the resin to 20 to 300 $\mu$g chloride per gram of resin.

2. The method as claimed in claim 1, wherein the anolyte is dilute aqueous mineral acid.

3. The method as claimed in claim 1, wherein both the anolyte and catholyte are dilute aqueous hydroxide.

4. The method as claimed in claim 1, wherein the anode cell comprises a tortuous path type spacer.

5. The method as claimed in claim 1, wherein the cathode cell is 10 to 15 mm thick.

6. The method as claimed in claim 1, wherein the anolyte and catholyte flow upwardly through the electrolytic cell.

7. The method as claimed in claim 1, wherein the catholyte is heated to a temperature compatible with the resin and anion selective permeable membrane being used.

8. The method as claimed in claim 1, wherein the resin is a type I strong base anion exchange resin.

9. The method as claimed in claim 1, wherein the chloride concentration of the resin is reduced to 20 to 100 $\mu$g chloride per gram of resin.

* * * * *